United States Patent

Walger

Patent Number: 5,599,481
Date of Patent: Feb. 4, 1997

[54] DEFOAMER

[75] Inventor: Kristina M. Walger, Charlotte, N.C.

[73] Assignee: Henkel Corporation, Plymouth Meeting, Pa.

[21] Appl. No.: 493,178

[22] Filed: Jun. 21, 1995

Related U.S. Application Data

[63] Continuation of Ser. No. 109,799, Aug. 20, 1993, abandoned.

[51] Int. Cl.$^6$ ..................................... B01D 19/04
[52] U.S. Cl. ............................ 252/358; 252/321; 8/552; 8/581
[58] Field of Search ................................. 252/321, 358; 8/552, 553, 554, 581

[56] References Cited

U.S. PATENT DOCUMENTS

| | | | |
|---|---|---|---|
| 3,652,453 | 3/1972 | MacDonnell | 252/321 |
| 4,006,273 | 2/1977 | Wolinski et al. | 427/264 |
| 4,021,365 | 5/1977 | Sinka et al. | 252/321 |
| 4,032,473 | 6/1977 | Berg et al. | 252/321 |
| 4,039,469 | 8/1977 | Raleigh | 252/321 |
| 4,107,073 | 8/1978 | Maciaszek | 252/321 |
| 4,369,039 | 1/1983 | Coates | 8/513 |
| 4,910,070 | 3/1990 | Al'Hariri | 428/181 |
| 4,956,119 | 9/1990 | Freil, Jr. et al. | 252/321 |
| 5,152,925 | 10/1992 | Furman | 252/321 |
| 5,261,927 | 11/1993 | Walger | 8/552 |

FOREIGN PATENT DOCUMENTS 2094330  9/1982  United Kingdom ................... 252/321

*Primary Examiner*—Richard D. Lovering
*Assistant Examiner*—Daniel S. Metzmaier
*Attorney, Agent, or Firm*—Ernest G. Szoke; Wayne C. Jaeschke; Real J. Grandmaison

[57] ABSTRACT

The present invention relates to a defoamer composition containing:
(a) from 0.8 to 3.0 parts by weight of silicone, wherein the silicone is in aqueous dispersed form employing a nonionic emulsifier;
(b) 5 to 40 parts by weight of mineral oil;
(c) 2 to 20 parts by weight of hydrophobic silica;
(d) 0.7 to 11 parts by weight of at least one nonionic surfactant selected from the group consisting of ethoxylated dioctyl or dinonyl phenols having a degree of ethoxylation of from 6 to 15, dioleate esters of polyethylene glycol, and ethoxylated hydrogenated castor oils;
(e) 0.2 to 4 parts by weight of acrylic polymer;
(f) 0.02 to 0.4 parts by weight of alkali metal hydroxide; and
(g) the balance, water, based on the weight of the defoamer composition and methods of preparing said compositions.

7 Claims, No Drawings

DEFOAMER

This application is a continuation of application Ser. No. 08/109,799 filed on Aug. 20, 1993, now abandoned.

BACKGROUND OF THE INVENTION

1. Field Of The Invention

This invention relates to defoamer emulsion compositions for use in textile dyeing operations.

2. Description Of Related Art

Defoamers used in textile dyeing must be efficient at reducing foam in aqueous media such as aqueous dyebaths. Most commercial defoamers used in textile dyeing operations are silicone-based materials containing about 15% by weight of silicone. Defoamers containing such amounts of silicone suffer from the disadvantage that some of the defoamer material adheres to the fibers being dyed resulting in non-uniform dye application. In addition, silicone-based defoamers may not be sufficiently stable in aqueous media, such as dyebaths.

Non-silicone defoamers have been developed to overcome the problems characteristic of silicone-based defoamers. Non-silicone defoamers, while exhibiting better stability and producing more uniform dyeing than commercial silicone containing defoamers also have disadvantages. They are difficult to disperse in aqueous media at low temperatures (e.g. about 1° C.). They require higher concentrations than is customary for silicone-based defoamers. Also, while the non-silicone defoamers are more stable that their silicone-containing counterparts, there is still a need for more stable defoamers, particularly for bleach systems, synthetic fiber dyebaths and wool dyebaths.

The defoamers according to the invention provide advantages over both standard silicone containing defoamers and those that do not contain silicone because they are stable in bleach systems, as well as synthetic fiber and wool dyebaths. They can readily be dispersed in water at low temperatures and may be used in lower concentrations than previous defoamers.

SUMMARY OF THE INVENTION

In accordance with the present invention there is disclosed a defoamer composition comprising a minor amount of silicone in the form of an emulsion, water, mineral oil, hydrophobic silica, nonionic surfactants, and, optionally an acrylic polymer and an alkali metal hydroxide.

The defoamers according to the invention are made by a process comprising mixing water and, if present, the optional acrylic polymer to form a first mixture followed by the addition of a relatively small amount of a silicone emulsion with silicone solids in the range of 5% to 50% by weight. A second mixture is prepared by combining the mineral oil, the nonionic surfactants and the hydrophobic silica. The first and second mixtures are then combined and agitated until homogenized.

BRIEF DESCRIPTION OF THE PREFERRED EMBODIMENTS

Unless otherwise indicated, all numbers expressing quantities of ingredients or reaction conditions used herein are to be understood as modified in all instances by the term "about".

The silicone emulsion employed in the present invention contains in the range of from 5 to 50% by weight of silicone dispersed in a suitable media such as water, typically in the presence of nonionic emulsifiers such as ethoxylated alcohols. The amount of the silicone emulsion used to form the defoamer composition should be sufficient to provide from 0.8 to 3.0% by weight of silicone to the defoamer composition. This amount is significantly less than standard silicone-containing defoamer compositions typically containing 15% by weight of silicone. The amount of the silicone emulsion for use in the defoamer composition of the present invention is therefore in the range of from 3.0 to 16.0 parts by weight, preferably 7.8 to 8.6 parts by weight based on 100 pts by weight of the defoamer composition. A suitable silicone emulsion for use in the present invention is FOAMKILL MS concentrate manufactured by Crucible.

The mineral oil which can be used in the defoamers according to the invention is any 80–150 sec mineral oil or paraffin oil. The preferred mineral oil is 105 second naphthenic-paraffenic oil such as Tufflo® 100C, a trademark product of Arco Chemical, Newtown Square, Pa., 19073. The amount of the mineral oil is generally 5.0 to 40.0 parts by weight, preferably 15 to 25 parts by weight, based on the weight of the defoamer composition.

The hydrophobic silica which can be used in the defoamers according to the invention is any precipitated silica-based hydrophobic silica. The preferred hydrophobic silica is Foamaster®2219X, a trademark product of Henkel Corporation, Ambler, Pa., 19002. The amount of hydrophobic silica can range from 2.0 to 20.0 parts by weight, preferably from 8.0 to 12.0 parts by weight.

The nonionic surfactants employed for the defoamer are present in an amount of from 0.7 to 11.0 parts by weight. One of the nonionic surfactants which can be used in the present composition according to the invention is dioleate esters of polyethylene glycol. The polyethylene glycol portion of these diesters can have a molecular weight of from 100 to 600. The preferred dioleate ester is a PEG 600 dioleate wherein the polyethylene glycol portion has a molecular weight of 600, which is equivalent to a degree of ethylene oxide polymerization of 13–14. The amount of dioleate ester of polyethylene glycol can range from 0.5 to 7.0 parts by weight, preferably from 2.0 to 3.0 parts by weight.

Another of the nonionic surfactants which can be used in the defoamer according to the invention are ethoxylated dioctyl or dinonyl phenols having a degree of ethoxylation of from 6 to 15. The preferred compound in this class is dioctyl phenol having a degree of ethoxylation of 9. The amount of ethoxylated dioctyl or dinonyl phenol can range from 0.1 to 2.0 parts by weight, preferably from 0.4 to 0.7 part by weight.

Ethoxylated hydrogenated castor oils can also be used in the defoamers according to the invention. Dacospin 12-R, a trademark product of Henkel Corporation, Ambler, Pa., 19002 is a typical example of this group of nonionic surfactants. The amount of ethoxylated hydrogenated castor oil can range from 0.1 to 2.0 parts by weight, preferably from 0.4 to 0.7 part by weight.

Water makes up the balance of the defoamer composition and is typically present in an amount of from 40 to 80 parts by weight, preferably 55 to 60 parts by weight, based on the total weight of the composition.

The optional acrylic polymer may be employed to thicken the defoaming composition and to improve the shelf life thereof. The preferred acrylic polymers are alkyl acrylates having 1 to 6 carbon atoms, most preferably ethyl acrylate. The amount of the acrylic polymer is typically 0.2 to 4.0 parts by weight, preferably 0.75 to 1.0 part by weight.

A pH increasing agent, such as an alkali metal hydroxide, most preferably potassium hydroxide, may be used to raise the pH of the defoamer composition to at least 8.0, preferably 8.0 to 8.5. The pH increasing agent is typically used when the defoamer composition contains the acrylic polymer described above. The amount of the optional pH increasing agent is generally 0.02 to 0.4, preferably 0.07 to 0.1 part by weight.

The defoamer composition may also contain customary preservatives such as an Kathon CG/ICP, a mixture of isothiazolinones manufactured by Rohm & Haas. The amount of the preservative present in the defoamer composition is typically 0.2 to 1.0 part by weight.

The following examples are illustrative of the invention and are not intended to limit the invention as encompassed by the claims forming part of the application.

EXAMPLE 1

Preparation of Defoamer Composition 0.87 gram of ethyl acrylate (Alco Gum L-15) was added to 57.14 grams of water. The mixture was stirred and the pH was adjusted to 8.0 to 8.5 with 0.09 gram of potassium hydroxide. 8.30 grams of a silicone emulsion containing 20% by weight of silicone (FOAMKILL MS concentrate) was added to the mixture under stirring. A second solution was prepared which comprised 20 grams of mineral oil (Tufflo® 100C), 3.5 grams of nonionic surfactants and 10 grams of hydrophobic silica (Foamaster®2219X). The nonionic surfactants included 0.5 gram of ethoxylated dioctyl phenol (Hyonic OP-55 made by Henkel Corp.), 0.5 gram of ethoxylated hydrogenated castor oil (DACOSPIN® a trademarked product of Henkel Corp.), and 2.5 grams of PEG-600 dioleate [NOPCO® Color-Sperse 188A PEG 600 dioleate (Henkel Corp.)] The two solutions were combined and mixed well followed by homogenization at 1,000–1,500 psi at 35–45° C. until the viscosity was between 1,000–2,400 cps measured at 25° C. using a Brookfield Viscometer equipped with a #3 spindle operating at 30 rpm.

EXAMPLE 2

Preparation of Defoamer Composition

To about 57.14 grams of water were added 8.3 grams of a silicone emulsion containing 30% by weight of silicone (FOAMKILL MS concentrate) under stirring. A second solution was prepared which comprised 20 grams of mineral oil (Tufflo® 100C), 3.5 grams of nonionic surfactants and 10.0 grams of hydrophobic silica (Foamaster®2219X). The nonionic surfactants included 0.5 gram of ethoxylated dioctyl phenol (Hyonic OP-55 made by Henkel Corp.), 0.5 gram of ethoxylated hydrogenated castor oil (DACOSPIN® a trademarked product of Henkel Corp.), and 2.5 grams of PEG-600 dioleate [NOPCO® Color-Sperse 188A PEG 600 dioleate (Henkel Corp.)] The two solutions were combined and mixed well followed by homogenization at 1,000–1,500 psi at 35–45° C. until the viscosity was between 1,000–2,400 cps measured at 25° C. using a Brookfield Viscometer equipped with a #3 spindle operating at 30 rpm.

EXAMPLE 3

A polyester dye bath (Sample 1) containing a standard polyester dye, a surfactant (e.g. sulfonated naphthalenes and/or naphthalene condensates), acetic acid, 0.5 gram/liter of the defoamer prepared in accordance with Example 1 and water was passed through a Gaston County Dye Tester which simulates the agitation and shear of a jet dye machine. The effect of the defoamer composition is measured by the amount of foam appearing in a column having a height of 20 cm.

The polyester dye bath was added to the Dye Tester which was operated at an initial temperature of 150° F. and a pressure of about 40 psi. The temperature was gradually raised to 265° F., held for 10 minutes, and then allowed to cool. Measurements of the amount of foam as determined by the height of the foam in the column, were made at various temperature levels and the results are shown in Table 1.

The same polyester dye bath without the defoamer (Sample 2) was added to the Dye Tester and operated in the same manner as described above. The amount of foam generated in the absence of the defoamer composition of the present invention is shown in Table 1.

TABLE 1

| Sample | Temp. | Foam Height |
| --- | --- | --- |
| 1 | 150° F. | 2.0 cm |
| 1 | 180° F. | 1.0 cm |
| 1 | 265° F. | 1.0 cm |
| 1 | 190° F. | 5.0 cm |
| 1 | 170° F. | 7.0 cm |
| 2 | 150° F.–265° F. | ~20.0 cm |

As shown in Table 1, the polyester dye bath containing the defoaming composition of the present invention exhibits superior antifoam properties as compared to the dye bath which does not contain the present defoaming composition.

EXAMPLE 4

A nylon dye bath (Sample 3) containing a standard nylon dye, surfactants (e.g. fatty amine ethoxalates), acetic acid, 0.25 gram/liter of the defoamer composition of Example 1 and water were tested in a Gaston County Dye Tester in the same manner as described in Example 3 except that the test was conducted under atmospheric pressure and the temperature was raised from an initial temperature of 100° F. to a maximum temperature of 210° F. The results are shown in Table 2.

The test was repeated (Sample 4) with a nylon dye bath as described above except without the defoamer composition of the present invention. The results are shown in Table 2.

TABLE 2

| Sample | Temp. | Foam Height |
| --- | --- | --- |
| 3 | 100° F. | 3.0 cm |
| 3 | 120° F. | 4.0 cm |
| 3 | 140° F. | 4.0 cm |
| 3 | 160° F. | 1.5 cm |
| 3 | 180° F. | 1.5 cm |
| 3 | 200° F. | 1.5 cm |
| 3 | 210° F. | 1.0 cm |
| 3 | 200° F. | 1.5 cm |
| 3 | 180° F. | 1.5 cm |
| 3 | 160° F. | 7.0 cm |
| 3 | 140° F. | 11.0 cm |

TABLE 2-continued

| Sample | Temp. | Foam Height |
|--------|-------|-------------|
| 3 | 120° F. | 12.0 cm |
| 4 | 100–210° F. | ~20.0 cm |

As shown in Table 2, the nylon dye bath containing the defoaming composition of the present invention exhibits superior antifoam properties as compared to the nylon dye bath which does not contain the present defoaming composition.

EXAMPLE 5

A bleach bath (Sample 5) containing hydrogen peroxide, surfactants (e.g., sulfated oils), a standard bleach stabilizer and silicate compound, water and 1.0 gram/liter of the defoamer composition of Example 1 was tested in a Gaston County Dye Tester in the same manner as described in Example 3 except that the test was conducted under atmospheric pressure and the temperature was raised from an initial temperature of 100° F. to a maximum temperature of 200° F. The results are shown in Table 3.

The test was repeated (Sample 6) with a bleach bath as described above except without the defoamer composition of the present invention. The results are also shown in Table 3.

TABLE 3

| Sample | Temp | Foam Height |
|--------|------|-------------|
| 5 | 100° F. | 5.0 cm |
| 5 | 130° F. | 3.0 cm |
| 5 | 150° F. | 2.0 cm |
| 5 | 180° F. | 1.0 cm |
| 5 | 200° F. | 1.5 cm |
| 5 | 180° F. | 1.0 cm |
| 5 | 150° F. | 2.0 cm |
| 5 | 130° F. | 2.0 cm |
| 6 | 100–200° F. | ~20.0 cm |

As shown in Table 3, the bleach bath containing the defoaming composition of the present invention exhibits superior antifoam properties as compared to the dye bath which does not contain the present defoaming composition.

What I claim is:

1. A defoamer composition consisting of:
   (a) from 0.8 to 3.0 parts by weight of silicone, wherein the silicone is in aqueous dispersed form employing a nonionic emulsifier;
   (b) 5 to 40 parts by weight of mineral oil;
   (c) 2 to 20 parts by weight of hydrophobic silica;
   (d) 0.7 to 11 parts by weight of at least one nonionic surfactant selected from the group consisting of ethoxylated dioctyl or dinonyl phenols having a degree of ethoxylation of from 6 to 15, dioleate esters of polyethylene glycol, and ethoxylated hydrogenated castor oils;
   (e) 0.2 to 4 parts by weight of acrylic polymer;
   (f) 0.02 to 0.4 parts by weight of alkali metal hydroxide; and
   (g) the balance, water, based on the weight of the defoamer composition.

2. The defoamer composition of claim 1 wherein said acrylic polymer is an alkyl acrylate wherein the alkyl group has 1 to 6 carbon atoms.

3. The defoamer composition of claim 2 wherein said alkyl acrylate is ethyl acrylate.

4. The defoamer composition of claim 1 wherein the amount of said ethoxylated dioctyl or dinonyl phenol is from 0.1 to 2.0 parts by weight, the amount of said dioleate esters of polyethylene glycol is from 0.5 to 7.0 parts by weight, and the amount of said ethoxylated hydrogenated castor oil is from 0.1 to 2.0 parts by weight, based on the total weight of the composition.

5. A defoamer composition consisting of:
   (a) from 0.8 to 3.0 parts by weight of silicone, wherein the silicone is in aqueous dispersed form employing a nonionic emulsifier;
   (b) 15 to 25 parts by weight of mineral oil;
   (c) 8.0 to 12.0 parts by weight of hydrophobic silica;
   (d) 2.0 to 3.0 parts by weight of a dioleate ester of polyethylene glycol wherein the polyethylene glycol portion has a molecular weight of from 100 to 600;
   (e) 0.4 to 0.7 part by weight of ethoxylated dioctyl phenol;
   (f) 0.4 to 0.7 part by weight of an ethoxylated hydrogenated castor oil;
   (g) 0.75 to 1.0 part by weight of ethyl acrylate;
   (h) 0.07 to 0.1 part by weight of potassium hydroxide;
   (i) up to 0.1 part by weight of a preservative; and
   (j) 55 to 60 parts by weight of water, based on the weight of said composition.

6. A method of preparing a defoamer composition consisting of:
   (a) mixing water, 0.2 to 4 parts by weight of acrylic polymer, 0.02 to 0.4 parts by weight of alkali metal hydroxide, and from 3.0 to 16.0 parts by weight of a silicone emulsion containing 5 to 50% by weight silicone based on the weight of said defoamer composition to form a first mixture;
   (b) mixing 5 to 40 parts by weight of a mineral oil, 0.7 to 11 parts by weight of at least one nonionic surfactant and 2 to 20 parts by weight of a hydrophobic silica, based on the weight of said defoamer composition to form a second mixture;
   (c) combining the first and second mixtures to form a third mixture; and
   (d) agitating the third mixture until homogenized.

7. The method of claim 6 wherein the acrylic polymer is an alkyl acrylate wherein the alkyl group has 1 to 6 carbon atoms.

\* \* \* \* \*